(12) United States Patent
Chaturvedi

(10) Patent No.: US 7,853,550 B1
(45) Date of Patent: Dec. 14, 2010

(54) DECISION SUPPORT SYSTEMS AND METHODS

(76) Inventor: Anil Chaturvedi, P.O. Box 322, Cabin John, MD (US) 20818-0322

( * ) Notice: Subject to any disclaimer, the term of this patent is extended or adjusted under 35 U.S.C. 154(b) by 0 days.

(21) Appl. No.: 12/501,899

(22) Filed: Jul. 13, 2009

Related U.S. Application Data

(63) Continuation of application No. 11/361,009, filed on Feb. 24, 2006, now Pat. No. 7,562,063.

(60) Provisional application No. 60/669,896, filed on Apr. 11, 2005.

(51) Int. Cl.
    G06F 17/10 (2006.01)
    G06F 15/18 (2006.01)
    G06N 5/02 (2006.01)
(52) U.S. Cl. .............. 706/47; 706/16; 706/46; 706/48
(58) Field of Classification Search ............ 706/47
    See application file for complete search history.

(56) References Cited

U.S. PATENT DOCUMENTS 5,124,911 A * 6/1992 Sack ................ 705/10

2002/0087388 A1 * 7/2002 Keil et al. ............ 705/10
2003/0040952 A1 * 2/2003 Keil et al. ............ 705/10

OTHER PUBLICATIONS

Cho et al., Exploring artificial intelligence-based data fusion for conjoint analysis, Expert Systems with Applications 24 (2003) 287-294.*
West et al., A Comparative Analysis of Neural Networks and Statistical Methods for Predicting Consumer Choice, Marketing Science, vol. 16, No. 4. (1997), pp. 370-391.*

* cited by examiner

*Primary Examiner*—Donald Sparks
*Assistant Examiner*—Nathan H Brown, Jr.
(74) *Attorney, Agent, or Firm*—Rothwell, Figg, Ernst & Manbeck, P.C.

(57) ABSTRACT

In one aspect, the invention is based on a process that combines information present in a joint distribution of the predictor variables and the variable (or variables) to be predicted. This information may be captured in the form of a table or other like data structure that includes a set of vectors (referred to as a "TAB"). The process uses the information in the TAB in conjunction with one or more rules. In one embodiment, a set of different rules are applied to the TAB to determine which rule in the set produces the most accurate predictions. The RULE that produces the most accurate predictions is then used in conjunction with observed information to make predictions.

14 Claims, 5 Drawing Sheets

TAB

|  | Age | | Gender | | Income | | Total |
|---|---|---|---|---|---|---|---|
|  | Young | Old | Male | Female | High | Low |  |
| Buyer | 50 | 150 | 100 | 100 | 120 | 80 | 600 |
| Non-Buyer | 600 | 200 | 200 | 600 | 100 | 700 | 2400 |
| Total | 650 | 350 | 300 | 700 | 220 | 780 |  |

FIG.3

RATIO RTAB

|  | Age | | Gender | | Income | | Total |
|---|---|---|---|---|---|---|---|
|  | Young | Old | Male | Female | High | Low |  |
| Buyer | 0.08 | 0.25 | 0.17 | 0.17 | 0.20 | 0.13 | 1.00 |
| Non-Buyer | 0.25 | 0.08 | 0.08 | 0.25 | 0.04 | 0.29 | 1.00 |

FIG.4

RATIO CTAB

|  | Age | | Gender | | Income | |
|---|---|---|---|---|---|---|
|  | Young | Old | Male | Female | High | Low |
| Buyer | 0.08 | 0.43 | 0.33 | 0.14 | 0.55 | 0.10 |
| Non-Buyer | 0.92 | 0.57 | 0.67 | 0.86 | 0.45 | 0.90 |
| Total | 1.00 | 1.00 | 1.00 | 1.00 | 1.00 | 1.00 |

FIG.5

RANK RTAB

|  | Age | | Gender | | Income | |
|---|---|---|---|---|---|---|
|  | Young | Old | Male | Female | High | Low |
| Buyer | 6.00 | 1.00 | 3.00 | 3.00 | 2.00 | 4.00 |
| Non-Buyer | 2.00 | 4.00 | 4.00 | 2.00 | 6.00 | 1.00 |

FIG.6

RANK CTAB 700

|  | Age | | Gender | | Income | |
|---|---|---|---|---|---|---|
|  | Young | Old | Male | Female | High | Low |
| Buyer | 2.00 | 2.00 | 2.00 | 2.00 | 1.00 | 2.00 |
| Non-Buyer | 1.00 | 1.00 | 1.00 | 1.00 | 2.00 | 1.00 |

FIG.7

CATEGORICAL RTAB 800

|  | Age | | Gender | | Income | |
|---|---|---|---|---|---|---|
|  | Young | Old | Male | Female | High | Low |
| Buyer | 0.00 | 1.00 | 1.00 | 1.00 | 1.00 | 0.00 |
| Non-Buyer | 1.00 | 0.00 | 0.00 | 1.00 | 0.00 | 1.00 |

FIG.8

CATEGORICAL CTAB 900

|  | Age | | Gender | | Income | |
|---|---|---|---|---|---|---|
|  | Young | Old | Male | Female | High | Low |
| Buyer | 0.00 | 0.00 | 0.00 | 0.00 | 1.00 | 0.00 |
| Non-Buyer | 1.00 | 1.00 | 1.00 | 1.00 | 0.00 | 1.00 |
| Total | 1.00 | 1.00 | 1.00 | 1.00 | 1.00 | 1.00 |

FIG.9

| Rating | Car Type | | | Transmission Type | | | Price | | |
|---|---|---|---|---|---|---|---|---|---|
| | compact | mid-size | SUV | Auto | Man | Hybrid | Low | Med | High |
| High | 2 | 3 | 2 | 5 | 1 | 1 | 3 | 2 | 2 |
| medium | 1 | 1 | 2 | 0 | 1 | 3 | 2 | 2 | 0 |
| Low | 3 | 2 | 2 | 2 | 5 | 0 | 1 | 2 | 4 |
| total | 6 | 6 | 6 | 7 | 7 | 4 | 6 | 6 | 6 |

DECISION SUPPORT SYSTEMS AND METHODS

This application is a continuation of application Ser. No. 11/361,009, filed Feb. 24, 2006, now U.S. Pat. No. 7,562,063, which claims the benefit of U.S. Provisional Patent Application No. 60/669,896, filed on Apr. 11, 2005. The contents of the above identified applications are incorporated herein by this reference.

BACKGROUND OF THE INVENTION

1. Field of the Invention

The present invention relates to decision support systems and methods. The embodiments of the invention have a broad range of applications. Any area of analysis wherein one tries to predict a variable of interest in order to make a decision (e.g., data base mining, biomedical disease prediction, prediction of likely purchasers of products, prediction of likely occurrence of events) can utilize embodiments of the invention. Thus, embodiments of the invention can be used in many applications for a variety of broad prediction purposes. A specific embodiment of the invention relates to designing new products and services. In marketing research and marketing analysis domains, this may be referred to as conjoint analysis.

2. Discussion of the Background

Decision support systems facilitate decision making. That is, they provide information that is useful when faced with a decision. For example, a decision support system that can categorize a potential customer as either a "buyer" or "non-buyer" of a particular product would be a valuable tool to a marketing specialist whose job it is to decide how best to market the particular product. However, a decision support system is only as good as the information it produces. For example, a decision support system that often incorrectly categorizes a potential customer would be detrimental, rather then helpful, to the marketing specialist. What is desired, therefore, is a decision support system that produces quality information.

SUMMARY OF THE INVENTION

The invention aims to, among other things, improve the prediction of key variables. Most prediction models use 'additive' models in some manner. Some models, such as TREE modeling techniques (e.g., classification and regression trees), do not assume additivity. The systems and methods described herein fall in the realms of non-additive modeling techniques. The systems and methods rely mostly on using part of a data set to learn patterns from the data, and then using those patterns to make predictions in the remaining part of the data that was not used for learning the patterns.

In this sense, the systems/methods of the present invention can be called a "learning based," pattern-recognition based prediction system/method. The systems/methods of the present invention are different from other learning based techniques (e.g., neural networks, which is also based on the use of additive models, and other learning based techniques), and artificial intelligence based techniques. The systems/methods according to the present invention, thus, are distinctly different from other existing approaches for predictive modeling.

In one aspect, the invention is based on a process that combines information present in a joint distribution of the predictor (or "independent") variables and the variable (or variables) to be predicted (a.k.a., the "dependent variable(s)"). This information may be captured in the form of a table or other like data structure that includes a set of vectors (e.g., rows x columns in a spreadsheet, a two-dimensional array, etc.) (hereinafter referred to as a "TAB"). The process uses the information in the TAB in conjunction with one or more rules (hereinafter referred to as "RULES"). In one embodiment, a set of different RULES are applied to the TAB to determine which RULE in the set produces the most accurate predictions. The winning RULE is then used in conjunction with observed information to make predictions.

In one embodiment, the process differs from other prediction processes in: (a) the manner in which the process formulates TABS from the information present in the dependent variable (or variables) and the independent variables, (b) the manner in which the process develops the comprehensive sets of RULES based on the TABS, (c) the manner in which it outlines the optimal selection of the RULES, (d) the manner in which the selected set of RULES are applied to the information in the TAB, and (e) the manner in which the RULES are then applied to cases on which predictions are desired.

In the case of using the present invention to perform conjoint analysis (or consumer choice analysis), the information contained in hypothetical products composed of hypothetical features and feature levels is combined with measurements of (a) ratings, rankings, or point allocation tasks performed by consumers, describing their liking for those hypothetical products or (b) consumers' choice of those hypothetical products made of hypothetical feature sets and levels. This information is used to formulate the TAB for each individual. The TABS are formed based on exposing individual consumers to a select few of the many possible combinations of products that can be made from these feature sets and feature levels. Many RULES that consumers typically might/could use in choosing products are then applied to the resulting TAB that has been formed for each individual. This helps in determining the optimal or best performing set of RULES for each individual consumer/client. The RULES in this case are the manner in which a consumer might use his/her like or dislike for individual features to determine whether to buy/choose a hypothetical product (i.e., a set of these features). The combination of the TAB and the RULES then provides the ability to make prediction of choice or liking for all possible combination of feature levels (hypothetical products) for each of the consumers. Thus, each individual consumers' likely response to all the possible hypothetical products can be obtained using our invention. The total marketplace response to any single hypothetical product is obtained by simply adding the response of all individual consumers in the sample or population.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 3 illustrates an example TAB.

FIGS. 4 and 5 illustrate an example RATIO-RTAB and an example RATIO-CTAB.

FIG. 6 illustrates an example RANK-RTAB.

FIG. 7 illustrates an example RANK-CTAB.

FIG. 8 illustrates an example CATEGORICAL-RTAB.

FIG. 9 illustrates an example CATEGORICAL-CTAB.

FIG. 10 illustrates another example TAB.

DETAILED DESCRIPTION OF THE PREFERRED EMBODIMENT

With reference to FIGS. 1-9, this section describes a specific embodiment of the present invention. In this embodiment, the present invention provides a system and method for making predictions (e.g., predictions of a dependent variable based on observation or information contained in the independent variables).

Figure 1:
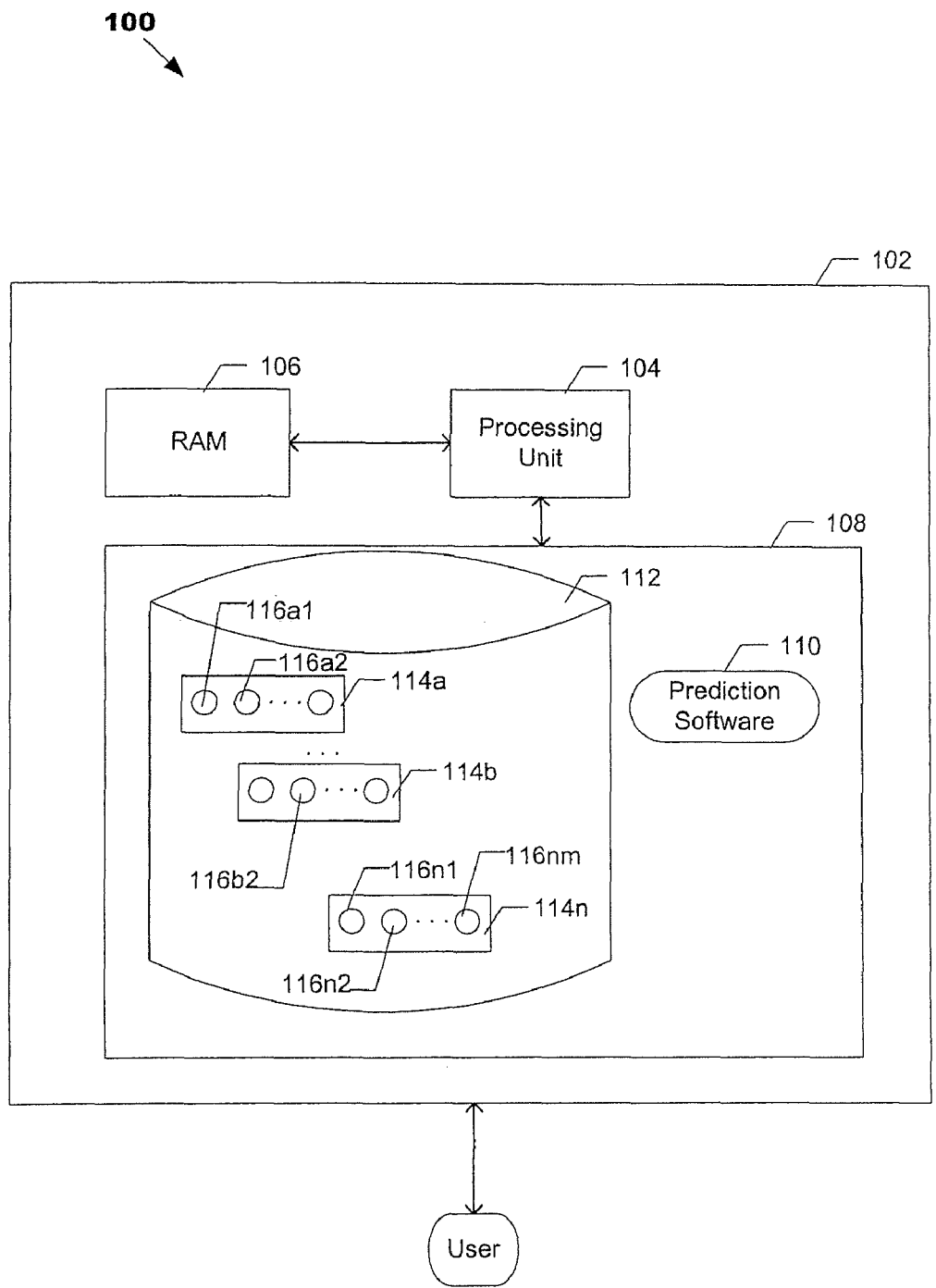
FIG. 1 is a block diagram illustrating a system 100 according to an embodiment of the invention.

FIG. 1 is a block diagram illustrating a system 100 according to an embodiment of the invention. In general, system 100 includes a general purpose computing device 102 (a.k.a., computer 102) having a processing unit 104 and random access memory (RAM) 106. Computer 102 may also include or have access to a non-volatile storage 108 (e.g., a hard drive or other non-volatile storage). In one embodiment, computer 102 includes prediction software 110 that is loaded into RAM 106 for execution by processing unit 104 and a collection of data 112 stored in storage 108. Data collection 112 includes a plurality of data sets $114_{a-n}$. Each data set 114, includes a plurality of data points $116_{i1-m}$, where each data point $116_{ij}$ corresponds to a variable.

As a concrete example, data collection 112 may be a collection of data corresponding to a group of people, where each data set 114 in collection 112 corresponds to a particular person. For example, data set 114a corresponds to one person and data set 114b corresponds to a different person. In this example, each data point 116 in each data set 114 corresponds to a variable about the person associated with the data set 114. For example, data point $116_{a1}$ of data set $114_a$ may be a value that represents the person's age and data point $116_{a2}$ may be a value that represents whether the person is "buyer" or "non-buyer" of a particular product.

Figure 2:
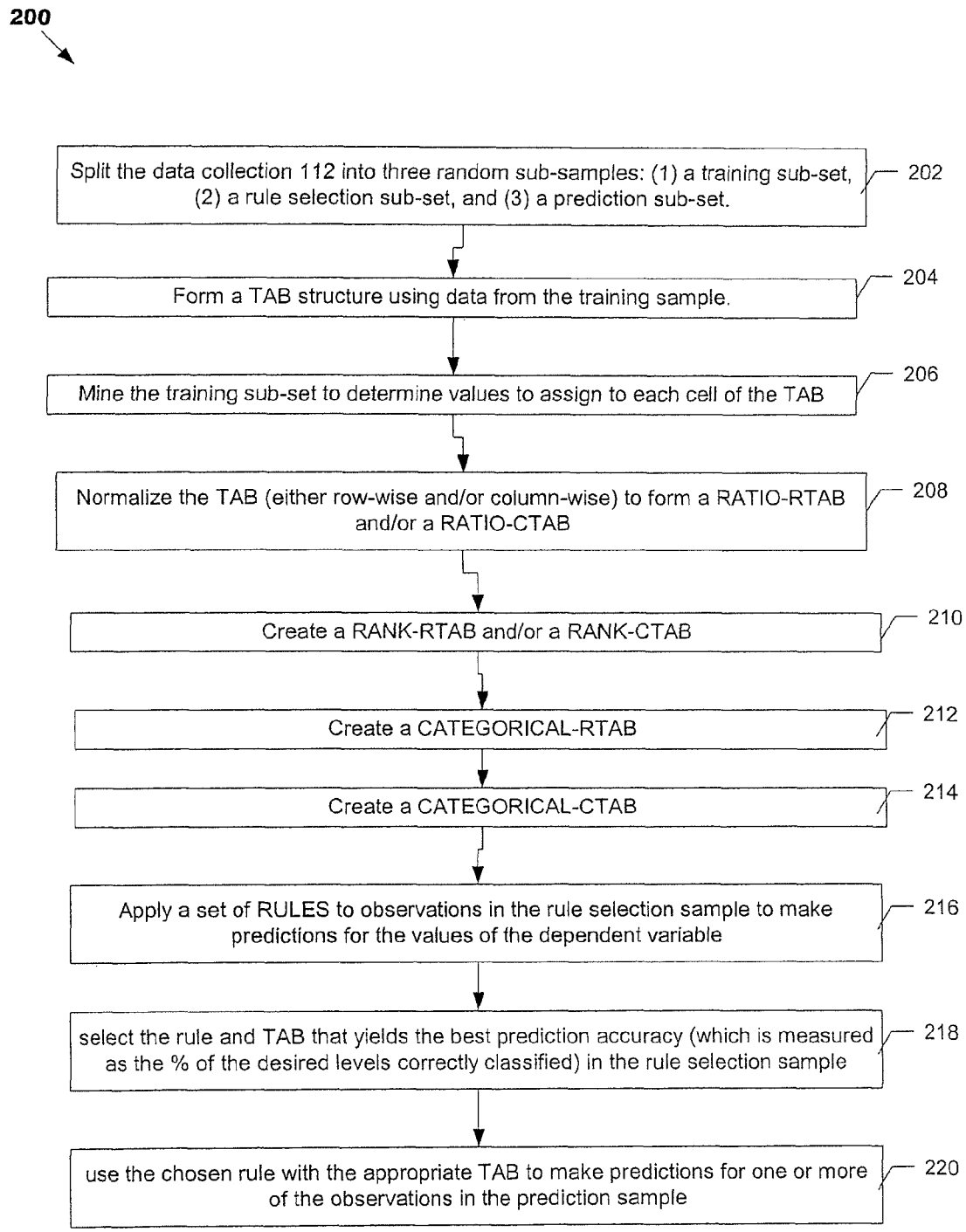
FIG. 2 is a flow chart illustrating a process according to an embodiment of the invention.

Referring now to FIG. 2, FIG. 2 is a flow chart illustrating a process 200 according to an embodiment of the invention. Many or all of the steps of process 200 may be performed by prediction software 110. Process 200 may begin in step 202, where the data collection 112 may be split into three random sub-samples: (1) a training sub-set, (2) a rule selection sub-set, and (3) a prediction sub-set. When three sub-sets are not possible, two sub-sets may be used (one sub-set can be used both as a training and a rule formation sub-set, and the other as a prediction sub-set, OR one sub-set can be used as a training sub-set and the other can be used as a rule formation and a prediction sub-set).

In step 204, a data structure 300 (or "TAB 300") (see FIG. 3) is formed using data from the training sample. The TAB 300 will have some number of one-dimensional arrays (i.e., vectors) (also referred to as "rows"), wherein each array of the TAB may have the same number of elements. The number of arrays is a function of the number of levels of the variable or variables to be predicted (i.e., the dependent variable(s)). The number of elements in the arrays is a function of the total number of levels of the independent variables, which are used to predict the dependent variable(s).

As an example, lets assume there is one dependent variable (Y) that we want to predict (e.g., whether a person is a "buyer" or "non-buyer") and assume dependent variable Y has two levels (e.g., (1) buyer and (2) non-buyer). In this case, TAB structure 300 formed in step 204 will have two arrays 301-302 (or rows), where each array corresponds to one of the levels of the dependent variable. For example, the first array 301 corresponds to buyer and the second array 302 corresponds to non-buyer.

For the sake of illustration, lets further assume that three data points (or "variables") are used to predict the dependent variable. For example, the three data points may be the person's age, gender, and income. In the example TAB 300 shown in FIG. 3, the age variable has two levels (young, old), the gender variable has two levels (male, female), and the income variable has two levels (low and high). Accordingly, each array 301-302 has 2+2+2=6 elements. In other words, TAB 300 has two rows and 6 columns (for a total of 12 cells). The formula for determining the number of columns (C) is $C=SUM(L_i)$ for i=1-N, which equals $L_1+L_2+\ldots+L_N$, where $L_i$ equals the number of levels of the $i^{th}$ independent variable, where N is the number of independent variables. Thus, each level in each independent variable gets assigned a column (we call it a dummy variable, dummy for short). It should be noted that for any data set 114, even though we have defined a total of C dummies, there would be only N dummies that would be assigned a value.

In step 206, the training sub-set is mined to determine values to assign to each cell of TAB 300 (e.g., each element of each array 301-302). In one embodiment, the value assigned to a cell of TAB 300 is simply a count of the number of observations in the training sub-set that correspond to the cell. For example, assume that the training sub-set includes 3000 data sets 114 (e.g., data corresponding to 3000 different people). In this example, if the training sub-set indicates that there are a total of 375 old people represented in the set, and 150 of these old people are buyers, 200 are non-buyers, and 25 of the old people have an undetermined purchase history, then cell C-12 is assigned a value of 150 and cell C-22 is assigned a value of 200. Accordingly, because cell C-21 has a value of 600, it means that in the training sub-set that was used to form the TAB 300, there are 600 young people who are non-buyers.

In step 208, TAB 300 may be normalized (either row-wise and/or column-wise) to form a RATIO-RTAB and/or a RATIO-CTAB. In a RATIO-CTAB, the columns add to 1, and in a RATIO-RTAB, the rows sum to 1. This can be easily achieved by dividing each value in a particular column by the sum of the values of the particular column (to form RATIO-CTAB) or by dividing all rows by the sum of the respective rows (to form RATIO-RTAB). Note that all row sums (corresponding to each level of the dependent variable) of RATIO-RTAB are 1, while all column sums of RATIO-CTAB are 1. FIGS. 4 and 5 illustrate an example RATIO-RTAB 400 and an example RATIO-CTAB 500, each of which was derived from TAB 300.

It should be noted that the RATIO-CTAB can be normalized further by dividing by all row sums to form the RATIO-CRTAB. Also, the RATIO-RTAB can be further normalized by dividing all columns by the column sums, to form the RATIO-RCTAB. Other variations are also possible. The invention encompasses all such possible ways of normalization such that the row and/or column sums of the resulting tabs are a pre-specified number (e.g., 1 or other pre-specified number)

In step 210, a RANK-RTAB and/or a RANK-CTAB may be created using TAB 300 or RATIO-RTAB/RATIO-CTAB, respectively. To form a RANK-RTAB, one may select each row from TAB 300 and assign a row-wise rank order to each value in the selected row. That is, the values in each row in TAB 300 are sorted, and a rank is assigned to each value in the row. Then, each value in TAB 300 is converted to a rank value, depending on its rank order within the row in which it occurs. This process results in the RANK-RTAB 600 (see FIG. 6).

Similarly, to form a RANK-CTAB, one may select each column from TAB 300 and assign a column-wise rank order to each value in the selected column. That is, the values in each column in TAB 300 are sorted, and a rank is assigned to each value in the column. Then, each value in TAB 300 is converted to a rank value, depending on its rank order within the column in which it occurs. This process results in the RANK-CTAB 700 (see FIG. 7).

In step 212, a CATEGORICAL-RTAB 800 (see FIG. 8) may be created using the data in TAB 300. The CATEGORICAL-RTAB 800 has the same structure as TAB 300, but contains only "binary" values (i.e., each cell contains either a "0" or a "1" or a value of "True" or False"). Accordingly, to form a CATEGORICAL-RTAB, one of two possible values is assigned to each cell of the TAB. In this example, we will assume that each cell is assigned a value of "0" or "1".

In one embodiment, the CATEGORICAL-RTAB 800 is created by simply converting the highest X number of values in any given row i of TAB 300 to a 1, and the rest of the values in the given row i to 0. The value of X is chosen carefully, and can be optimized at the end to get the best overall prediction. Preferably, X is less than the number of variables (N) that make up TAB 300. CATEGORICAL-RTAB 800 shows an example where X=3. As indicated by CATEGORICAL-RTAB 800, the cells of CATEGORICAL-RTAB 800 that correspond to the largest 3 values in each row of TAB 300 are assigned a value of 1, and the rest of the cells are assigned a value of 0. Accordingly, each row of CATEGORICAL-RTAB 800 has at least three cells that contain the value 1. In the example shown in FIG. 8, the dummies for Old, Male, Female, and High income drives "Buyer", while dummies for Young, Female, and Low Income would drive "Non-Buyer". Note that "Buyer" has 4 dummies (drivers) as there is a tied value at 100 in the first row of TAB 300. Also, as shown in the TAB 800, "female" is a driver of both Buyer and Non-Buyer.

In step 214, a CATEGORICAL-CTAB 900 (see FIG. 9) may be created using the data in TAB 300 (or the data in RATIO-CTAB 500). The CATEGORICAL-CTAB 900 has the same structure as TAB 300, but contains only "binary" values (i.e., each cell contains either a "0" or a "1" or a value of "True" or False"). Accordingly, to form a CATEGORICAL-CTAB 900, one of two possible values is assigned to each cell of the TAB. In this example, we will assume that each cell is assigned a value of "0" or "1".

In one embodiment, the CATEGORICAL-CTAB 900 is created by simply converting the highest Z number of values in any given column i of TAB 300 (or RATIO-CTAB 500) to a 1, and the rest of the values in the given column i to 0. The value of Z is chosen carefully, and can be optimized at the end to get the best overall prediction. Preferably, Z is less than the number of rows in TAB 300. CATEGORICAL-CTAB 900 shows an example where Z=1. As indicated by CATEGORICAL-CTAB 900, the cells of CATEGORICAL-CTAB 900 that correspond to the largest value in each column of TAB 300 are assigned a value of 1, and the rest of the cells in the column are assigned a value of 0. Accordingly, each column of CATEGORICAL-CTAB 900 has at least one cell that contains the value 1. In the example shown in FIG. 9, the dummy "High Income" would drive "Buyer", and the other dummies (young, old, male, female, and low income) would drive "Non-Buyer". It should be noted that other modified versions of the TAB, the RATIO-RTAB, RATIO-CTAB, CATEGORICAL-RTAB, CATEGORICAL-CTAB, RANK-RTAB, RANK-CTAB can be also formed. The variations are many, and they are all included within the scope of the present invention.

The CATEGORICAL-RTAB and the CATEGORICAL-CTAB, in some cases, can also be elicited using direct response from individual respondents (e.g., consumers). Consumers can be presented a task where in they might be asked to rate each level of each feature (i.e. Dummies) on a scale corresponding to the dependent variable (0-10, high-medium-low, etc).

In step 216, a set of RULES are applied to all observations in the rule selection sample to make predictions for the values of the dependent variable. Various rules are discussed below.

1. The Categorical Rule:

Implementation of the categorical rule is facilitated by using TAB 800 or 900. In some embodiments, the first step in applying the categorical rule is to retrieve each data set 114 (a.k.a., "an observation") from the rule selection sample. In our example, each retrieved data set is associated with a particular person and includes information pertaining to the person's age, gender and income. Next, for each observation (i.e., data set), determine the dummy variables for the observation (e.g., determine whether the person is young or old, male or female, and high-income or low-income based on the data included in the data set). Next, one counts how many dummies in the observation are classified as driving each level of the dependent variable. This should be clear from the CATEGORICAL-RTAB 800 or CATEGORICAL-CTAB 900. Then, let $N_i$ be the number of dummies classified as drivers of level i (or row i) of the dependent variable for a selected observation. Then, assign the dependent variable prediction to level "i" if $N_i - N_j > T$, where T is a pre-specified threshold, i is the level with the largest number of drivers, and j is the level with the second largest number of drivers. Each value of T results in a different categorical rule, and thus, different predictions.

Simply stated, this rule simply labels each level of each independent variable as either (a) a driver of a particular level of the dependent variable, (b) a driver of multiple levels of the dependent variable, or (c) not a driver of any level of the dependent variable. Predictions for a particular observation are made based on how many drivers that observation has for each level of the dependent variable. Prediction of a level i of the dependent variable is made only if the number of dummies driving level i is greater than the number of dummies driving each other level by at least a threshold amount T (where T could be any real number in the relevant range, or T could be an integer). Depending on the data in question, different values of T would result in different correct classification rates. After a prediction is made based on an observation, the accuracy of the prediction is determined based on the actual dependent variable value from the observation. That it, we determine whether the prediction is correct by comparing the predicted value to the true value of the dependent variable.

In one example, assume an observation for a particular person indicates that the person is young, male and has low-income. With this observation, if the CATEGORIICAL-RTAB 800 is used to make a prediction and T is set to 1, then the prediction would be a "non-buyer" since there are two drivers of the non-buyer level (Low income and Young) and one driver of Buyer level (Male). If CATEGORICAL-CTAB 900 is used, the prediction is also "Non-Buyer" since all the three dummies (young, male and low-income) drive "Non-Buyer" (the only dummy in CATEGORICAL-CTAB 900 that drives "Buyer" is high-income). The prediction would be deemed correct if the data about the person indicates that the person is in fact "non-buyer."

2. The Rank Rule:

For each observation to be predicted from the rule selection sample, the following steps may be performed. For each row of the RANK-RTAB 600 or the RANK-CTAB 700, add the ranks of the dummies that are turned on for that observation. The prediction for that observation is simply the value of the dependent variable corresponding to the row with the "highest" rank. In the example shown, the row with the lowest sum of the rank values is the row that has the "highest" rank. However, in embodiments where a high number represents a high rank and a relatively lower number represents a lower rank (i.e., 1 is a low rank and 10 is a higher rank), then the prediction for that observation is simply the value of the dependent variable corresponding to the row with the highest sum of the rank values.

In the example data, say the observation to be predicted is a low-income, young, male. In this case, if the RANK-RTAB 600 is used, then the prediction based on this observation would be "Non-Buyer" since the sum of ranks for "Buyer" for these dummies (young, male, low-income) is 13 (13=6+3+4), and the sum of ranks for Non-Buyer is 7 (7=2+4+1). In other words, with respect to the "Buyer" row of TAB 600, "young" is associated with a rank of 6, "male" is associated with a rank of 3, and "low-income" is associated with a rank or 4. Thus, the sum for the "Buyer" row given the observation of low-income, young, male is 13. If the RANK-CTAB 700 is used, the prediction is also a "Non-Buyer" since the sum of the ranks for Non-Buyer is 3 (3=1+1+1), and the sum of ranks for Buyer is 6 (6=2+2+2).

3. The Ratio Rule:

The ratio rule is facilitated by using the RATIO-RTAB 400 or RATIO-CTAB 500. In this case, each entry in the cross tabulation is a ratio. For each of the observation to be predicted from the rule selection sample, the following process can be followed: For each row of the RATIO-RTAB 400 or the RATIO-CTAB 500, add the ratios of the dummies that are turned on for that observation. The prediction for that observation is simply the value of the dependent variable corresponding to the row with the highest sum of the ratios.

In our example data, say the observation to be predicted is a low-income, young, male. If we use RATIO-RTAB 400, then the prediction would be a Non-Buyer since the sum of the ratios for Buyer for these dummies is 0.38, and the sum of ratios for Non-Buyer is 0.62. If the RATIO-CTAB 500 is used, the prediction is also a Non-Buyer since the sum of the ratios for Buyer is 0.51, and the sum of ratios for Non-Buyer is 2.49.

4. The Maximum-Count Rule (Applicable for Rank ordered levels in the Dependent Variable):

When the levels of the dependent variable are ordered, (either an increasing or decreasing order), then the maximum-count rule can be applied using the CATEGORICAL-RTAB 800 or the CATEGORICAL-CTAB 900. To make a prediction based on an observation, the following procedure may be used: Let $N_i$ be the number of dummies in the observation to be predicted that are drivers of level i of the dependent variable. Then, assign the dependent variable prediction to the level i that has the highest $N_i$. Thus, if the dependent variable has three ordered levels (i.e., i=3), then if $N_2 > N_1 > N_3$, then, according to the maximum-count rule, level 2 will be the prediction.

In our example data, say the observation to be predicted is a low-income, young, male. If we use CATEGORICAL-RTAB 800, then the prediction would be Non-Buyer (i.e., level 2 of the dependent variable) because the number of dummies in the observation that drive Non-Buyer is 2, the number of dummies in the observation that drive Buyer is 1, and 2 is greater than 1.

5. The High Rule (Applicable for Rank Ordered Levels in the Dependent Variable):

When the levels of the dependent variable Y are ordered, (either an increasing or decreasing order), then a version of the max rule can be applied using the CATEGORICAL-RTAB or the CATEGORICAL-CTAB. For an observation to be predicted, the following procedure is adopted: Let $N_i$ be the number of dummies classified as drivers of level i of the dependent variable. Also, assume that the levels are ordered as level 1>level 2>level 3>>level $C_y$. Then, in the High rule, assign the dependent variable prediction to the highest ordered level for which $N_i > 0$. Thus, for example, if $N_1 > 0$, then level 1 will be predicted, and if $N_1 = 0$ and $N_2 > 0$, then level 2 will be predicted. In other words, predict level j (where J>1) if $N_1$ through $N_{(j-1)}$ are all equal to zero and $N_j > 0$.

6. The Low Rule (Applicable for Rank Ordered Levels in the Dependent Variable):

When the levels of the dependent variable are ordered, (either an increasing or decreasing order), then a version of the min rule can be applied using the CATEGORICAL-RTAB or the CATEGORICAL-CTAB. For an observation to be predicted, the following procedure is adopted: Let $N_i$ be the number of dummies classified as drivers of level i of the dependent variable. Also, assume that the levels are ordered as level 1<level 2<level 3<<level $C_y$. Then, in the Low rule, assign the dependent variable prediction to the lowest ordered level for which $N_i > 0$. Thus, for example, if $N_1 > 0$, then level 1 will be predicted, and if $N_1 = 0$ and $N_2 > 0$, then level 2 will be predicted. In other words, predict level j (where J>1) if $N_1$ through $N_{(j-1)}$ are all equal to zero and $N_j > 0$.

7. Other Rules (Situation specific rules or other miscellaneous rules). Many other rules can be constructed based on the TABS formulated in steps 208-214. It is impossible to list the many functions and forms these Rules could take. However, any procedure (mathematical, logical, arithmetic, or some combination thereof) that uses the RTAB or CTAB, RANK RTAB or the RANK CTAB, and the RATIO RTAB and RATIO CTAB or any combination or hybrid versions of the TABS should fall under the purview of this patent application.

In step 218, the rule and TAB combination (RULE-TAB) that yields the best prediction accuracy (which may be measured as the percentage (%) of the desired levels correctly classified) in the rule selection sample is selected. This selected rule may be referred to as the "chosen rule". For example, if it is determined that using the rank rule with the RANK-CTAB provides the best prediction accuracy, then the rank rule and the RANK-CTAB are selected.

In step 220, the chosen rule and TAB are used to make predictions for one or more data sets in the prediction sample. That is, this step involves using the chosen rule with the appropriate TAB (TAB, CATEGORIGAL-RTAB, CATEGORIGAL-CTAB, RANK-RTAB, RANK-CTAB, RATIO-RTAB, or RATIO-CTAB), to make predictions for one or more of the observations in the prediction sample.

Conjoint Analysis

In this section, we will describe how an embodiment of the present invention can be used to perform conjoint analysis.

In traditional conjoint analysis, a sample of likely consumers is presented a set of hypothetical products (e.g., cars) that are composed of hypothetical features such as car-type, transmission-type, and price. The hypothetical features have levels associated with them (e.g., car-type could be a compact, mid-size, and SUV for a total of 3 levels). Assuming there are 3 levels for car-type, 3 levels for price, and 3 levels for transmission-type, one could form 3×3×3=27 different cars.

In order to assess which of these 27 cars would be the most likeable car, consumers may be presented with a subset of the 27 possible hypothetical cars (e.g., 18 hypothetical cars). Each consumer in the sample then may perform any one of the following four tasks to provide information on the relative attractiveness of the 18 hypothetical cars: (1) a rating task, where each of the 18 cars is rated on a scale (say 1-10); (2) a choice task, where each consumer chooses among a subset of the 18 hypothetical cars; and (3) a ranking task, wherein each consumer ranks all the 18 hypothetical cars from the most liked to the least liked, or (4) a constant sum or point allocations task where each consumer allocates points (say 100) across multiple options, based on their preference or likelihood to purchase or buy.

After the consumers perform one of the four tasks listed above, in traditional conjoint analysis, statistical analysis techniques (such as regression analysis, ANOVA analysis, Logit analysis) are applied to each consumer's data to assess how much each consumer likes each of the levels of the hypothetical features (these are called utilities for the levels). Once the utilities are known, one can make predictions about the remaining 9 (27−18=9) hypothetical products that the consumers in the sample did not evaluate.

In summary, traditional conjoint analysis presents only a small subset of a large number of hypothetical products to consumers, and still provides the ability to make inferences on how much the consumers' would have liked each of the many possible hypothetical products, without actually presenting all the hypothetical products to them.

Embodiments of the present invention work quite well in analyzing conjoint data. We will now illustrate how an embodiment of the present invention would work in the case of Conjoint analysis.

For the purposes of illustration, let us assume that 1000 consumers are presented with 18 hypothetical cars, where each hypothetical car has three hypothetical features: (1) Car-type, (2) transmission-type, and (3) price, and each feature has at most three levels. For example, car-type has the following three levels: compact, mid-size and SUV; transmission-type has three levels: automatic, manual and hybrid; and price has three levels: low, medium, and high.

Next, assume that the customers perform either (a) a rating task, ranking task, a ratio or point allocation task, or choice task as in conventional conjoint analysis wherein they rate, rank, or allocate points across full/partial hypothetical product sets or choose from multiple partial/full hypothetical products sets or (b) a self-explication task, wherein each consumer is presented a task where they might be asked to rate or select each level of each feature (i.e., dummy) on a scale corresponding to the dependent variable (0-10, high-medium-low, or "critical-to-have"–"desirable-but-not-critical-to-have"–"Undesirable", etc), without ever presenting to them the full or even partial hypothetical products to rate, rank, or to choose from. Accordingly, after each of the 1000 customers perform one of the tasks, a collection of data having 1000 data sets or observations is formed (i.e., we will have a data set for each one of the 1000 consumers).

It should be noted that, if the consumers did not perform the self-explication task, then, after the consumer data is collected, one may use a first subset of the data as a training sample and second subset as the rule selection sample. In studies where it is not possible to separate the training and rule selection samples (due to a small number of hypothetical products being shown to consumers for collecting data), the same sample can be used for both training and rule selection.

After obtaining a data set for each one of the consumers, the next step in the process is to form, for each consumer, one or more TABS (e.g., a RATIO, CATEGORICAL and/or RANK TAB) using some or all of the collected data (e.g., the training sample). The CATEGORICAL-RTAB and the CATEGORICAL-CTAB, in some cases, may be elicited using direct response from individual respondents (or consumers). For example, if the individual respondents performed the self-explication task (as described above), then the CATEGORICAL-RTAB and the CATEGORICAL-CTAB may be created directly from the responses.

If a consumer was asked to perform a rating or ranking task, then the rows of the TAB would be the number of points on the rating, ranking, or point allocation scale, or some collapsed versions of the rating/ranking/point allocation scale (e.g., a 0-10 rating scale data could be converted to a High, Medium, and Low rating scale by converting score from 8-10 to high, 5-7 to a medium, and 0-4 to low). This would result in an ordered dependent variable. In the example where a rating scale is converted to three levels (high, medium, and low) then the resulting TAB would have three rows, with each row corresponding to one of the levels.

In the example wherein the hypothetical cars have three features (e.g., car-type, transmission-type, and price) and the first feature has three levels, the second feature three levels, and the third feature three levels, then the TAB will have 9 (3+3+3) dummies or columns, wherein each dummy or column corresponds to a level of one of the features.

As a concrete example, FIG. 10 illustrates an example TAB 1000 corresponding to a particular customer. A customer TAB like the one shown below may be created for all of the customers.

The TAB 1000 illustrates that one customer was presented with at least 18 different cars and asked to rate each car as "high," medium" or "low." As the TAB shows, of the 18 cars 6 are compact, 6 are mid-size, and 6 are SUV. Additionally, of the 18 cars 7 have automatic transmission, 7 have manual transmission, and 4 have a hybrid transmission. Lastly, of the 18 cars, 6 are priced low, 6 are priced medium and 6 are priced high.

The TAB 1000 also reveals that the customer rated two of the SUV cars as "low" and rated two as "high". As another example, the TAB also reveals that 5 of the cars having automatic transmission were rated "high" by the customer and none of the cars having automatic transmission were rated "medium" by the customer. Using the methods described above, one can easily create ratio, categorical and rank TABS based on the initial or raw TAB 1000.

For choice tasks, a customer TAB is formed in the following fashion described in this paragraph and the paragraphs below. The TAB will have two rows (i.e., the dependent variable would have two levels—"Choice" or "No-Choice") because for any kind of choice task (e.g., choosing 1 out of 5 hypothetical products, or 1 from 2 hypothetical products, or any combination thereof), one would form a TAB with 2 rows (corresponding to a Choice and a No-Choice option).

The number of columns would equal the total number of independent feature levels in the choice study (in the example given above there were 9 (3+3+3) columns). Next, one would set all cell values initially to 0. Next, we can use each of the "training" choice tasks to populate the TABS using the following two steps.

First, for each data set in the training sample, designate the dummies corresponding to the features of the chosen hypothetical products as drivers of a "Choice" option. This is done by adding a value of (1-1/N) (where N is the number of options in the choice task) to the value in the cells in the TAB whose rows corresponds to the "Choice" level, and whose columns correspond to the feature levels comprising the chosen option in the choice task. For example, if the cell corresponding to the "choice" level and SUV car type has an initial value of 2.7, and N is set to 10, and a data set indicates that the consumer selected one SUV type car, then the processing of the data set would cause the value 0.9 (1-1/10) to be added to the value in the cell so that the cell would end up with a value of 3.6 after the data set is processed.

Second, for each choice task in the training set, designate the dummies corresponding to the features of the not-chosen hypothetical products as drivers of the "No-choice" level. This is done by placing a value of 1/N (where N is the number of options in the choice task) in the cells of the TAB whose rows corresponds to the "No-choice" option, and whose columns correspond to the feature levels of the not-chosen options in the choice task.

It should be noted that the steps described above can be modified by substituting the values (1-1/N) and (1/N) with other values that are suitable for the particular choice context, or many possible versions of those values could be tried and optimized to get the best results. All such variations are included within the scope of the present invention.

Moreover, one could use only subsets of the TABS for choice tasks described above (e.g., only some rows or some columns in the TABS for choice tasks, or some weighted combination of subsets from the TAB for choice tasks wherein some rows and/or columns of the TAB for choice tasks may be weighted additively or combined using logical rules to form different subsets). These resulting subsets from TABS for choice tasks can then be combined with other values other than (1-1/N) and (1/N) to make predictions based only on those subsets. Finally, these subset based predictions can also then be applied iteratively to successive smaller or different subsets to get tree-like choice predictions.

After forming the TAB(s), one applies the RULES described above to make predictions for the hypothetical products in the rule selection sample. Next, after applying the RULES, one determines the RULE that yields the best possible predictions for the consumer in the rule selection sample.

After determining the rule that yields the best possible predictions for the consumer, one may wish to store the information on the drivers for each level of the dependent variable, the best performing RULE, and the type of cross-tabulation or TAB that was used for making the predictions, for that consumer in a spreadsheet/database table/other computer data storage format The process should be repeated for each of the 1000 consumers.

Then, on may use the stored information on each of the 1000 consumers' drivers of product attractiveness, and the best-performing RULES for each of the consumers to make prediction on the consumer's holdout hypothetical products that the consumers did not provide attractiveness information for.

The information on the drivers of attractiveness and the best performing RULES is then used to perform cluster analysis (using such popular clustering procedures such as Chaturvedi, Green, and Carroll's K-Modes clustering) to find adequate sized segments based on different drivers of attractiveness and different RULES that they use for making decisions. The segmentation on just the drivers and RULES would be termed "benefit segmentation".

However, the segmentation could easily go beyond drivers of attractiveness and the RULES consumers had used to rate/rank/point allocate across/choose products. The segmentation could use the drivers and RULES for consumers together with their attitudes, behaviors, needs and wants, demographic information, psychographic information and other relevant product, category, or consumer information to find segments that are very useful for marketing purposes.

Embodiments of the present invention can be used quite fruitfully under a variety of applications. Some other applications that are possible included, among others: (1) Predicting responses for more than one dependent variable—When there are multiple dependent variables, the multiple dependent variables may be combined into one dependent variable based on their joint distribution in the sample data; the prediction problem is then treated as a single dependent variable with many independent variables prediction problem and (2) using embodiments of the present invention in conjunction with, or as a component of, any combination of statistical, human judgment based, or computer aided software or hardware processes.

It will be readily apparent that the various processes and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the processes described above and illustrated in the drawings are shown as a sequence of steps, this was done solely for the sake of illustration. Accordingly, it is contemplated that some steps may be added and other steps omitted, and the order of the steps may be re-arranged. In other words, any sequence or order of steps that may be described does not necessarily indicate a requirement that the steps be performed in that order. The steps of processes described herein may be performed in any order practical. Further, some steps may be performed simultaneously.

What is claimed is:

1. A method for predicting a dependent variable based on N independent variables, wherein each independent variable (i) has $L_i$ number of levels, comprising:

storing a collection of data in storage unit of a computing device, wherein the data collection includes a plurality of observations that includes at least N data points, where each of the N data points within any given one of the plurality of observations corresponds to a different one of the N independent variables;

retrieving at least a portion of the data collection to use as a training sample;

retrieving at least a portion of the data collection to use as a rule selection sample;

creating one or more TABs using the data contained in the training sample, wherein each of the one or more TABs comprises X number of vectors, wherein X is equal to the number of levels of the dependent variable, and wherein each of the X vectors consists essentially of Y values and each of the X vectors corresponds to a different one of the levels of the dependent variable, where Y=SUM(Li) for i=1 to N, where Li is the number of levels of the ith independent variable;
selecting a rule from a set of rules;
selecting an observation from the rule selection sample;
predicting said variable assigning a prediction to a level of the dependent variable using one or more of the TABs, the selected rule, and the N data points from the selected observation that correspond to the N independent variables; and
determining the accuracy of the prediction.

2. The method of claim 1, wherein the rule selection sample is different than the training sample.

3. The method of claim 1, wherein the step of creating one or more TABS comprises creating a RATIO-RTAB and/or a RATIO-CTAB.

4. The method of claim 3, wherein the step of creating one or more TABS comprises creating a RANK-RTAB and/or a RANK-CTAB.

5. The method of claim 1, wherein the step of creating one or more TABS comprises creating a RANK-RTAB and/or a RANK-CTAB.

6. The method of claim 1, wherein the step of creating one or more TABS comprises creating a CATEGORICAL-RTAB and/or a CATEGORICAL-CTAB.

7. The method of claim 1, wherein at least one of the one or more created TABS comprises X vectors wherein each of said X vectors consists essentially of Y rank values, each rank value being associated with a dummy; and
the step of assigning a prediction to a level of the dependent variable comprises:
(a) determining the dummies for the selected observation;
(b) for each vector, summing the vector rank values that are associated with the determined dummies;
(c) after performing step (b), determining the vector that has the highest or lowest rank value sum; and
(d) after performing step (c), assigning the prediction to the level of the dependent variable that corresponds to the vector that has the highest or lowest rank value sum.

8. The method of claim 1, wherein at least one of the one or more created TABS categorizes, for each level of the dependent variable, each level of each independent variable as either a driver or non-driver of the dependent variable level, and the step of assigning a prediction to a level of the dependent variable comprises:
(a) determining the dummy variables for the given observation;
(b) for each level of the dependent variable, determining the total number of dummies in the observation that are classified as driving said level;
(c) after performing step (b), determining (1) the level of the dependent variable that has the highest total number of dummies in the observation that are classified as driving said level (Level 1) and (2) the level of the dependent variable that has the second highest total number of dummies in the observation that are classified as driving said level (Level 2); and
(d) after performing step (c), assigning the dependent variable prediction to Level 1 of the dependent variable if, and only if, the total number of dummies classified as driving Level 1 is greater than the total number of dummies classified as driving Level 2 of the dependent variable by a predetermined amount.

9. The method of claim 1, wherein at least one of the one or more created TABS comprises X vectors, wherein: each of said X vectors corresponds to a different level of the dependent variable and comprises a plurality of values, each value being associated with a dummy, and each value being greater than or equal to 0 and less than or equal to 1; and
the step of assigning a prediction to a level of the dependent variable comprises:
(a) determining the dummies for the given observation;
(b) for each vector, summing the vector values that are associated with the determined dummies;
(c) after performing step (b), determining the vector that produced the highest vector value sum; and
(d) after performing step (c), assigning the dependent variable prediction to the level of the dependent variable that corresponds to the vector that produced the highest vector value sum.

10. The method of claim 1, wherein the dependent variable has a plurality of ordered levels, at least one of the one or more created TABS comprises X vectors, wherein: each of the X vectors corresponds to a different level of the dependent variable and comprises a plurality of values, each value being associated with a dummy, and each value being equal to either 0 or 1; and
the step of assigning a prediction to a level of the dependent variable comprises:
(a) determining the dummies for the given observation;
(b) for each vector, summing the vector values that are associated with the determined dummies;
(c) after performing step (b), assigning the dependent variable prediction to the highest or lowest ordered level of the dependent variable that corresponds to a vector that produced a vector value sum that is greater than 0.

11. A system for predicting a level of a dependent variable based on a given observation of a plurality of independent variables, wherein the dependent variable comprises K levels and each independent variable has two or more levels, comprising:
a storage unit;
software stored in the storage unit; and
a data processor for executing the software, wherein the software is configured to:
(a) for each level of the dependent variable, use a plurality of observations to categorize each level of each independent variable as either a driver or non-driver of said level of the dependent variable;
(b) determine the dummy variables for the given observation;
(c) for each level of the dependent variable, determine the total number of dummies in the observation that are classified as driving said level;
(d) after performing step (c), determine (1) the level of the dependent variable that has the highest total number of dummies in the observation that are classified as driving said level (Level 1) and (2) the level of the dependent variable that has the second highest total number of dummies in the observation that are classified as driving said level (Level 2); and
(e) after performing step (d), assign the dependent variable prediction to Level 1 of the dependent variable if, and only if, the total number of dummies classified as driving Level 1 is greater than the total number of dummies classified as driving Level 2 of the dependent variable by a predetermined amount.

12. A system for assigning a prediction to a level of a dependent variable based on a given observation, comprising:
(a) means for forming a plurality of vectors, wherein: each vector corresponds to a different level of the dependent variable, each vector comprises a plurality of rank values, and each rank value of each vector is associated with a dummy;

(b) means for determining the dummies for the given observation;

(c) means for, for each vector, summing the vector rank values that are associated with the determined dummies;

(d) means for determining the vector that has the highest or lowest rank value sum; and (e) means for assigning the dependent variable prediction to the level of the dependent variable that corresponds to the vector that has the highest or lowest rank value sum.

13. A computer program product, stored in a non-transitory computer readable medium, for assigning a prediction to a level of a dependent variable based on a given observation, comprising:

(a) instructions for forming a plurality of vectors, wherein: each vector corresponds to a different level of the dependent variable, each vector comprises a plurality of values, each value of each vector is associated with a dummy, and each value of each vector is greater than or equal to 0 and less than or equal to 1;

(b) instructions for determining the dummies for the given observation;

(c) instructions for, for each vector, summing the vector values that are associated with the determined dummies;

(d) instructions for determining the vector that produced the highest vector value sum; and (e) instructions for assigning the dependent variable prediction to the level of the dependent variable that corresponds to the vector that produced the highest vector value sum.

14. A computer program product, stored in a non-transitory computer readable medium, for assigning a prediction to a level of a dependent variable based on a given observation, wherein the dependent variable has a plurality of ordered levels, comprising:

(a) instructions for forming a plurality of vectors, wherein: each vector corresponds to a different level of the dependent variable, each vector comprises a plurality of values, each value of each vector is associated with a dummy, and each value of each vector is equal to either 0 or 1;

(b) instructions for determining the dummies for the given observation;

(c) instructions for, for each vector, summing the vector values that are associated with the determined dummies;

(d) instructions for assigning the dependent variable prediction to the highest or lowest ordered level of the dependent variable that corresponds to a vector that produced a vector value sum that is greater than 0.

* * * * *